United States Patent [19]

Takemori et al.

[11] Patent Number: 4,468,777
[45] Date of Patent: Aug. 28, 1984

[54] MIRROR SUPPORTING FRAME FOR GAS LASER OSCILLATION APPARATUS

[75] Inventors: Satoshi Takemori; Hiroyuki Sugawara; Kouji Kuwabara, all of Hitachi; Toshiharu Shirakura, Ibaraki; Yukio Kawakubo; Kouji Sasaki, both of Hitachi, all of Japan

[73] Assignee: Hitachi, Ltd., Tokyo, Japan

[21] Appl. No.: 308,120

[22] Filed: Oct. 2, 1981

[30] Foreign Application Priority Data

Oct. 8, 1980 [JP] Japan ................... 55/139802

[51] Int. Cl.³ .............................................. H01S 3/08
[52] U.S. Cl. .................................................. 372/107
[58] Field of Search ................... 372/107, 93

[56] References Cited

U.S. PATENT DOCUMENTS 3,683,297 8/1972 Hobert et al. .................. 372/35

FOREIGN PATENT DOCUMENTS 50-3920 2/1975 Japan .
51398 4/1979 Japan ......................... 372/35

Primary Examiner—James W. Davie
Attorney, Agent, or Firm—Antonelli, Terry & Wands

[57] ABSTRACT

A gas laser oscillation apparatus wherein, in order to prevent a center axis of a reflecting mirror included in a laser resonator from deviating from an optical axis of the laser resonator due to the deformation of a mirror supporting frame caused by a vacuum force applied to a laser tube, the reflecting mirror is fixed to a mirror holding plate, which is attached to the mirror supporting frame with fasteners such as bolts and nuts.

12 Claims, 12 Drawing Figures

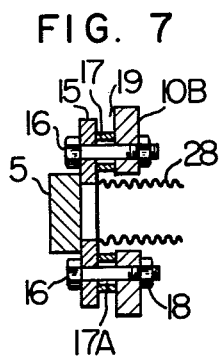
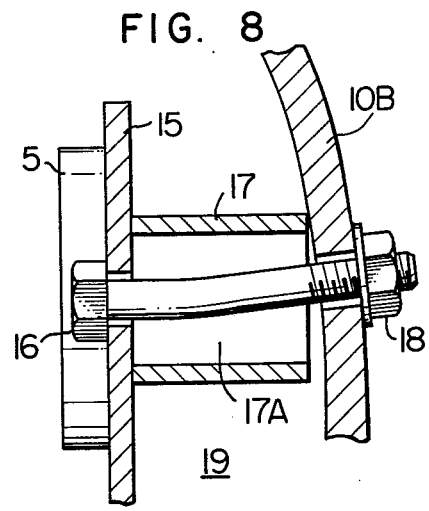
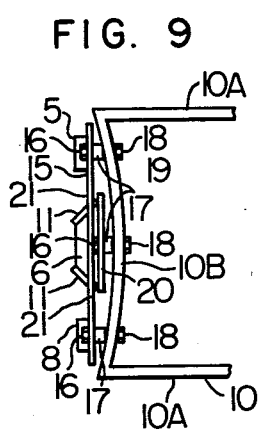
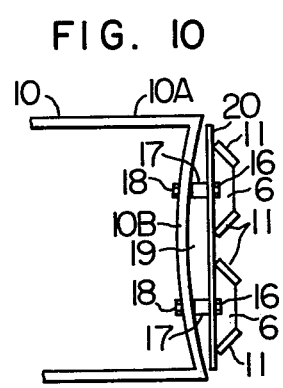
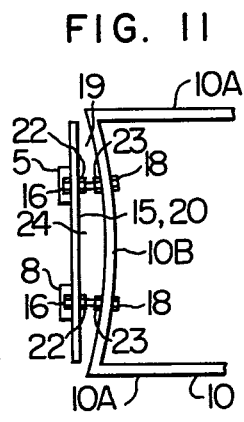
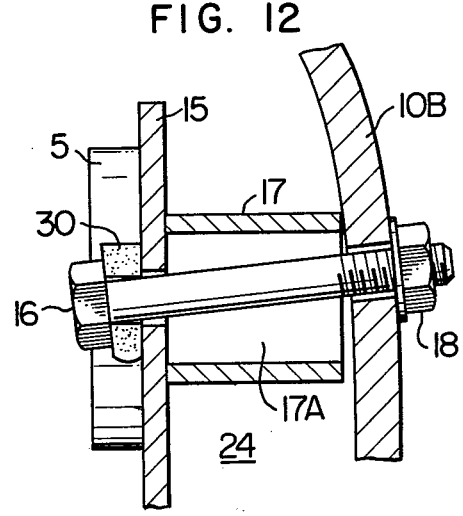

MIRROR SUPPORTING FRAME FOR GAS LASER OSCILLATION APPARATUS

BACKGROUND OF THE INVENTION

The present invention relates to a gas laser oscillation apparatus, and, more particularly, to an improvement in a structure for mounting various mirrors, of a laser resonator, on a mirror supporting frame.

Generally, in a gas laser oscillation apparatus, a gaseous laser medium is excited by glow discharge to generate a laser beam.

More particularly, in a high power type gas laser oscillation apparatus, the temperature of the apparatus is remarkably raised due to the glow discharge. In order to minimize the adverse effect of the above-mentioned temperature rise, a laser tube, forming a laser resonator, is mounted on a base in an expansible or contractible manner, and mirrors, connected to the laser tube at both ends and a part thereof, are mounted on a mirror supporting frame movable in a direction of the axis of the laser tube.

Further, a Japanese Patent Application (Publication No. 3920/1975) discloses adjusting means for finely displacing a spherical mirror in alignment with an optical axis.

As shown in FIG. 1, a known gas laser oscillation apparatus includes four laser tubes 1, namely, glass tubes, connected optically in series to form a laser tube connection body. A gaseous laser medium is enclosed in each sealed laser tube 1, and a cathode 2 and an anode 3 are arranged at both ends of each laser tube 1. A high voltage from a d.c. high voltage source 4 is applied to the cathode 2 of each laser tube 1 to generate glow discharge in the laser tube 1.

A total reflection mirror 5 and an output mirror 8 are mounted on both ends of the laser tube connection body, and a hollow block member 6, provided with a pair of mirrors for bouncing a laser beam back and forth, is included in the laser tube connection body at a middle part thereof. The laser tube connection body, total reflection mirror 5, output mirror 8, and block member 6 form a laser resonator.

The laser resonator is mounted through holding parts 12 on a base 13 in such a manner that the resonator can expand or contract in the direction of the axis of laser tube 1. On the other hand, a mirror supporting frame generally designated by the reference numeral 10 is mounted through the holding parts 12 on the base 13 in such a manner that the frame 10 is placed in substantially the same plane as the laser tube connection body. The mirror supporting frame 10 includes a pair of longitudinal frames 10A disposed in parallel to the laser tube 1 and a pair of transverse frames 10B disposed perpendicular to the laser tubes 1, to form a rectangular frame.

The total reflection mirror 5 and the output mirror 8 are mounted directly on one of the transverse frames 10B, and the block memeber 6 is mounted directly on the other transverse frame 10B. Metal bellows 28 and the like are included in the laser tube connection body in order to absorb the thermal deformation of laser tube 1 in the axial direction.

The gaseous laser medium is excited by the glow discharge in each laser tube 1 to generate a laser beam. The laser beam is generated back and forth between the total reflection mirror 5 and the output mirror 8, formed as a partial reflection mirror 11, through a pair of mirrors provided in the block member 6, and is thereby amplified. A part of the laser beam thus amplified passes through the output mirror 8, and is emitted from the laser resonator as an output beam 9.

In order to prevent the total reflection mirror 5, output mirror 8 and a pair of mirrors 11 from being thermally displaced due to a temperature rise caused by the glow discharge in each laser tube 1, these mirrors are mounted on the mirror supporting frame 10 and supported by the base 13 in such a manner that these mirrors can freely move in the direction of the optical axis of the laser tube connection body.

Further, the pressure of the gaseous laser medium in each laser tube 1 is on the order of 4 kPa (kilopascals), and, can be regarded as a vacuum. Accordingly, a large vacuum force F is applied to the mirrors, namely, the total reflection mirror 5, the output mirror 8 and a pair of mirrors 11, which serve as walls between vacuum and atmospheric pressure on the order of 100 kPa. For example, when the total reflection mirror 5 and the output mirror 8 each mounted on the transverse frame 10B of the mirror supporting frame 10 have a diameter of 10 cm, a vacuum force F of about 80 KgW is applied to each of these mirrors.

FIGS. 2 and 3 show the bending of the mirror supporting frame 10 shown in FIG. 1 due to the abovementioned vacuum force, and the deviation of the center axis of each mirror caused by the above deflection.

In the case where the transverse frame 10B is formed of a steel plate having a length L of 100 cm, a thickness t of 1 cm and a width W of 20 cm, and the total reflection mirror 5 and the output mirror 8 are mounted on the transverse frame 10B at positions which are spaced apart from both ends of the frame 10B by a length $l_1$ of 30 cm, the transverse frame 10B is deformed as indicated by dotted lines in FIGS. 2 and 3, due to the vacuum force of about 80 KgW applied to the mirrors 5 and 8, and a maximum deflection V at a central part of the frame 10B is nearly equal to 20 $\mu$m.

Due to such deformation of the transverse frame 10B, the center axis of each of the total reflection mirror 5 and the output mirror 8 is inclined at an angle $\theta$ of about $4 \times 10^{-5}$ rad with the optical axis X of the laser resonator, as shown in FIG. 3. As a result, when the total length of the laser resonator is equal to 6 m, the optical axis of the laser resonator is displaced on the mirrors 5 and 8 by about 2 mm each time the laser beam makes one round trip between the mirrors 5 and 8. Such displacement of the optical axis decreases the power of the output beam.

As mentioned above, the conventional laser oscillation apparatus shown in FIGS. 1 to 3, namely, the laser oscillation apparatus in which the mirrors 5, 8 and 11 are mounted directly on the mirror supporting frame 10, has a drawback that the center axis of each of these mirrors 5, 8, 11 deviates from the optical axis of the laser resonator due to the deformation of the mirror supporting frame caused by the vacuum force F. In a laser apparatus, in which a high-accuracy adjustment of optical axis is required, the above-mentioned drawback is fatal, and therefore the power of output beam is decreased remarkably. Further, in a case where the laser tube connection body is large-sized, that is, a diameter of each mirror and the length of the laser resonator are larger in order to obtain a high-power laser apparatus, the deformation of the mirror supporting frame is increased, the deviation of the center axis of each mirror from the optical axis is also increased, and finally it becomes impossible to generate laser oscillation.

SUMMARY OF THE INVENTION

An object of the present invention is to provide a gas laser oscillation apparatus which can eliminate the above-mentioned drawback of the conventional gas laser oscillation apparatus and in which the deviation of the center axis of a mirror from the optical axis of a laser resonator, (especially, of a laser tube) due to a vacuum force never takes place to generate a stable laser output.

The above and other objects, features and advantages of the present invention will become more clear from the following descriptions with reference to the accompanying drawings.

BRIEF DESCRIPTION OF THE DRAWINGS

FIG. 7 is an enlarged sectional view of the part shown in FIG. 6, taken along the line VII—VII;

FIG. 8 is an enlarged sectional view for showing the bending of the bolt shown in FIG. 6;

FIG. 9 is a plan view of a structure for mounting a total reflection mirror, output mirror and block member on a front transverse frame member of a mirror supporting frame;

FIG. 10 is a plan view of a structure for mounting a pair of block members on a rear transverse frame member of a mirror supporting frame;

FIG. 11 is a plan view of another embodiment of a structure according to the present invention for attaching a mirror holding plate, in which no spacer is used to attach the mirror holding plate; and FIG. 12 is an enlarged sectional view of a further embodiment of a structure according to the present invention for attaching a mirror holding plate, in which a spacer is used to attach the mirror holding plate.

DESCRIPTION OF THE PREFERRED EMBODIMENTS

Figure 4:
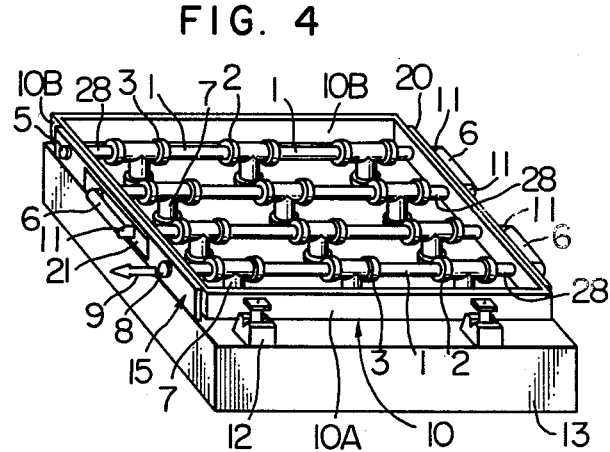
FIG. 4 is a perspective view showing an embodiment of a gas laser oscilation apparatus according to the present invention.

Referring now to the drawings wherein like reference numerals are used throughout the various views to designate like parts and, more particularly, to FIG. 4, according to this figure, a laser tube connection body in the present embodiment is equipped with eight laser tubes 1 to form a high-power gas laser oscillation apparatus, and three block members 6 are included in the laser tube connection body. A pair of mirrors 11 for bouncing a laser beam back and forth are incorporated in each of the block members 6. A total reflection mirror 5 and an output mirror 8 are mounted on a front transverse frame 10B at both end portions thereof, and a block member is mounted at a central portion of the above frame. Further, two other block members 6 are mounted on a transverse frame 10B on the rear side.

Figure 5:
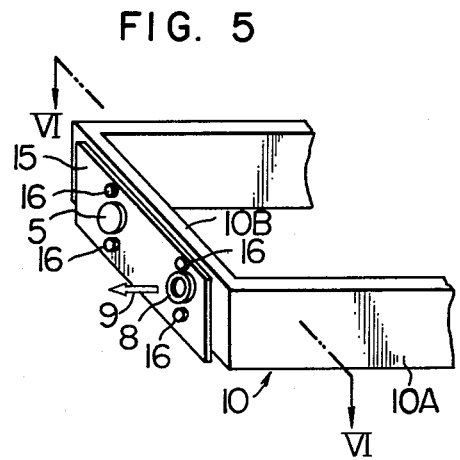
FIG. 5 is a perspective view showing a part of the embodiment shown in FIG. 4 which includes the mirror holding plate.
Figure 6:
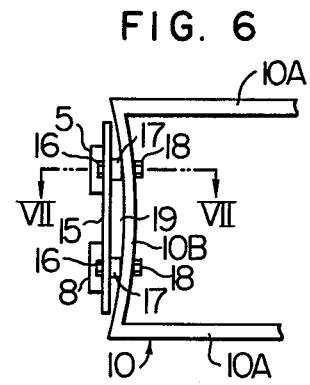
FIG. 6 is a plan view of the part along the line VI—VI shown in FIG. 5.

Referring to FIGS. 5 to 7, the total reflection mirror 5 and the output mirror 8 are first mounted on a mirror holding plate 15, which is a steel plate having a predetermined thickness. The mirror holding plate 15 is attached, through spacer members 17, to the front transverse frame 10B at four positions, namely, two positions on upper and lower sides of the total reflection mirror 5 and two positions on upper and lower sides of the output mirror 8. In more detail, the mirror holding plate 15 is fixed to the front transverse frame 10B by fasteners such as bolts 16 and nuts 18. Each of the spacer members 17 is a sleeve-shaped member having a through hole, into which a bolt 16 is inserted. Further, bellows 28 are provided between the mirror holding plate 15 and the laser tube connection body in such a manner that one end of each bellows 28 is connected to the mirror holding plate 15, as shown in FIG. 7, and the other end is connected to one of the laser tubes 1. In FIGS. 5, 6, 8, 9 and 10, the bellows 28 are omitted for clarity.

As shown in FIG. 7, a pair of bolts 16 are attached to the mirror holding plate 15 and transverse frame 10B at two positions on upper and lower sides of the total reflection mirror 5 in such a manner that the center of the mirror 5 lies on the straight line connecting these bolts 16. Further, it is desirable to arrange these bolts 16 symmetrically with respect to the center of the mirror 5. Since the stress generated in the transverse frame 10B varies with position the displacement of the transverse frame 10B also varies with position. However, each amount of displacement is equal on each straight line connecting the bolts 16 and the center of the mirror 5, when the two lines are located symmetrically. These bolts may be made of an ordinary material.

The spacer members 17 are interposed between the mirror holding plate 15 and the transverse frame 10B to form a gap 19, that is, to prevent the plate 15 and the frame 10B from being kept in contact with each other at positions other than the spacer members 17.

FIG. 8 is an enlarged view showing a region of the main part shown in FIG. 6 which supports the total reflection mirror 5. As is apparent from FIG. 8, the bolt 16 is slightly bent in the through hole 17A of the spacer member 17 in accordance with the bending of the transverse frame 10B. (Note that the bending of the bolt 16 is exaggerated in FIG. 8). Accordingly, the mirror holding plate 15 is never subjected to bending. In other words, the bending of the transverse frame 10B is absorbed by the bending of the bolt 16. While a structure for supporting the total reflection mirror 5 has been explained in the above description, a similar structure is employed to support the output mirror 8.

Referring to FIG. 9, the total reflection mirror 5 and output mirror 8 are mounted on the mirror holding plate 15 as shown in FIGS. 5 to 8, and the mirror holding plate 15 is attached through four spacer members 17 to the transverse frame 10B by the bolts 16 and nuts 18. These spacer members 17 form the gap 19 between the mirror holding plate 15 and the transverse frame 10B, and thus, the mirror holding plate 15 is prevented from being brought into contact with the transverse frame 10B at positions other than the spacer members 17.

On the other hand, as shown in FIGS. 9 and 10, the block member 6 provided with a pair of mirrors 11, is mounted on a block member holding plate 20, and the block member holding plate 20 is attached, through the spacer members 17, to the transverse frame 10B by the bolts 16 and nuts 18. Accordingly, the block member holding plate 20 is also prevented from being kept in contact with the transverse frame 10B at positions other than the spacer members 17.

While the mirror holding plate 15 has been attached through the spacer members 17 to the transverse frame 10B on the front side at four positions, that is, two positions on upper and lower sides of the total reflection mirror 5 and two positions on upper and lower sides of the output mirror 8, the block member holding plate 20 is attached through the spacer members 17 to the transverse frame 10B on the front side at two positions on upper and lower sides of the center of the block member. Further, an aperture 21 (FIG. 9) is made in the mirror holding plate 15 at a central part thereof to attach the block member holding plate 20 provided with the block member 6 to the transverse frame 10B on the front side. Thus, the holding plate 20 and block member 6 are prevented from being kept in contact with the mirror holding plate 15.

The bolts for attaching the block member holding plate 20 to the transverse frame 10B are arranged on a straight line, along which the transverse frame 10B is subjected to the same displacement, and on which the center of the block member 6 lies.

On the other hand, a vacuum force from each of a pair of mirrors 11 is applied to the block member holding plate 20 in the direction inclined at 45° to the plate 20, and a reaction force from each spacer member 17 is also applied to the plate 20. These forces produce a bending moment on the block member holding plate 20. However, since this bending moment is relatively small and the block member 6 is a hollow member having a very large rigidity, the block member holding plate 20 is never subjected to bending. Accordingly, the center axes of both mirrors 11 are always kept at 45° with the optical axis of the laser resonator, and therefore a stable output beam can be obtained.

When the block member 6 is fixed to the frame 10B, or when the block member 6 is fixed to the holding plate 20, bolts 16 are attached to the block member 6 at positions on a center line between a pair of mirrors 11. Strictly speaking, the bolts 16 are attached at positions in a plane which meets at right angles with a straight line connecting the centers of both mirrors 11 at the midpoint of this straight line.

Referring to FIG. 10, two block members 6 each provided with a pair of mirrors 11 for turning back a laser beam, are attached to a block member holding plate 20, and the block member holding plate 20 is connected through spacer members 17 to the transverse frame 10B on the rear side. In more detail, the plate 20 is attached to the transverse frame 10B with bolts 16 and nuts 18 at four positions, that is, two positions on upper and lower sides of the center of one of the block members and two positions on upper and lower sides of the center of the other block member. The spacer members 17 form a gap 19 between the block member holding plate 20 and the transverse frame 10B, and thus, the plate 20 is prevented from being kept in contact with the transverse frame 10B at positions other than the spacer members 17.

In the structure shown in FIG. 10, the block member holding plate 20 is applied with no bending moment, for substantially the same reason as has been explained with respect to FIG. 8. Therefore, the block member holding plate 20 is never subjected to bending. In other words, although the transverse frame 10B is bent as shown in FIG. 10, the block member holding plate 20 is never affected by such bending. Accordingly, the center axes of both mirrors 11 mounted on each block member 6 are always kept at 45° with the optical axis of the laser resonator, and therefore a stable output beam can be obtained.

Figure 1:
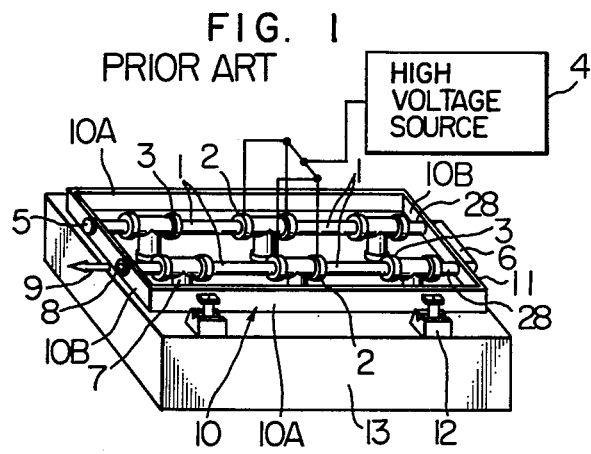
FIG. 1 is a perspective view showing an example of a conventional gas laser oscillation apparatus.
Figure 2:
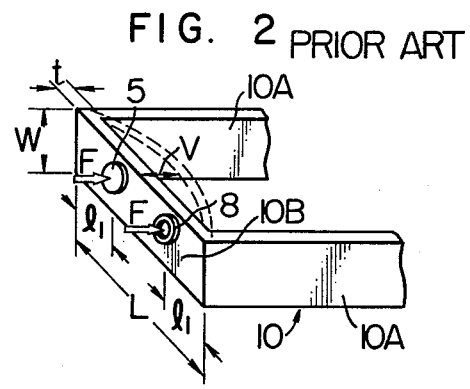
FIG. 2 is a perspective view showing a part of the apparatus shown in FIG. 1 for mounting a total reflection mirror and an output mirror.
Figure 3:
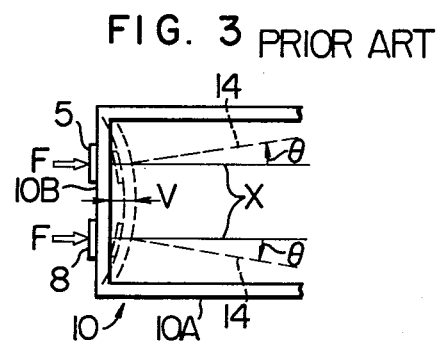
FIG. 3 is a plan view of the mounting part shown in FIG. 2.

The embodiment shown in FIGS. 4 to 10 has substantially the same structure as the conventional gas laser oscillation apparatus shown in FIGS. 1 to 3, except the above-mentioned parts; therefore, a further explanation of the present embodiment is omitted.

FIG. 11 shows another embodiment of a structure for attaching the mirror holding plate 15 or block member holding plate 20 to the transverse frame 10B. Referring to FIG. 11, the mirror holding plate 15 or block member holding plate 20 is attached to the transverse frame 10B with bolts 16, without employing the above-mentioned spacer members 17. The holding-plate attaching bolts 16 are made of a material which can produce a predetermined elastic deformation such as shown in FIG. 8 when applied with a bending moment. Each of the bolts 16 is fixed at the head part thereof to the mirror holding plate 15 or block member holding plate 20 by a nut 22, and is fixed at the other end part thereof to the transverse frame 10B by nuts 18 and 23. At each bolt 16, the nut 22 on the side of the mirror holding plate 15 or block member holding plate 20 is spaced apart from the nut 23 on the side of the transverse frame 10B by a predetermined distance to form a gap 24. Accordingly, when the previously-mentioned vacuum force is applied, each bolt 16 is freely bent as shown in FIG. 8 in accordance with the deformation of the transverse frame 10B. As a result, the mirror holding plate 15 or block member holding plate 20 is never subjected to bending, even when the transverse frame 10B is deformed.

FIG. 12 shows a further embodiment of a structure for attaching the mirror holding plate 15 or block member holding plate 20 to the transverse frame 10B. As is apparent from the comparison between FIGS. 8 and 12, the bolt 16, within the through hole 17A of a spacer member 17, is not subjected to bending, but an elastic material 30, in contact with the bolt head, is deformed in accordance with the deformation of the transverse frame 10B. Thus, the mirror holding plate 15 is prevented from being deformed.

Further, a structure wherein the elastic material 30 is placed between the transverse frame 10B and the nut 18 can produce a similar effect to the structure of FIG. 12.

The embodiment shown in FIG. 12 has substantially the same structure as the embodiments shown in FIGS. 4 to 11, except the above-mentioned parts. Therefore, a further explanation of this embodiment is omitted.

In the foregoing description, explanation has been made on the case where a gas laser oscillation apparatus includes a plurality of laser tubes 1. It is needless to say that the present invention is applicable to a gas laser oscillation apparatus including a single laser tube 1.

As explained above, according to the present invention, any one of the center axes of the total reflection mirror 5, the output mirror 8 and a pair of mirrors 11 for bouncing laser beam back and forth, all of which form a laser resonator, never deviates as a result of the vacuum forces applied to the mirrors 5, 8, 11. Accordingly, even a high-power type gas laser oscillation apparatus, in which a stronger vacuum force is applied to mirrors, can emit a stable laser beam without decreasing the output power.

We claim:

1. A gas laser oscillation apparatus including a laser resonator in which a total reflection mirror and an output mirror are respectively provided at both ends of a laser tube connection body, a hollow block member provided with a pair of mirror means for bending a laser beam, and a supporting frame means for receiving said laser resonator and for supporting said total reflection mirror and said output mirror, the apparatus comprising:

a first holding plate means for holding said total reflection mirror and said output mirror, a second holding plate means for holding said hollow block member, meas for attaching said second holding plate means to said supporting frame means, at least a first pair of fastening means for attaching said first holding plate means to said supporting frame means with an air gap formed between said first holding plate means and said supporting frame means, at least a second pair of fastening means for attaching said first holding plate means to said supporting frame means, said first pair of fastening means being arranged on a straight line, said second pair of fastening means being arranged on a straight line, said supporting frame means being subjected to the same deformation along said straight lines, a center of said total reflection mirror and a center of said output mirror respectively lying on said straight lines, and said first and second pairs of said fastening means are arranged symmetrically with respect to said respective centers of said total reflection mirror and said output mirror.

2. A gas laser oscillation apparatus according to claim 1, wherein a spacer means is interposed between each of said holding plate means and said supporting frame for forming said air gap.

3. A gas laser oscillation apparatus according to claim 2, wherein an elastic material is interposed between a part of each of said fastening means and each of said holding plate means.

4. A gas laser oscillation apparatus according to claim 1, further comprising a second hollow block member provided with a pair of mirror means for bending a laser beam, said second hollow block member being mounted on said first holding plate means, and a third hollow block member provided with a pair of mirror means for bending a laser beam, said third hollow block means being mounted on said second holding plate means.

5. A gas laser oscillation apparatus including a laser resonator in which a total reflection mirror and an output mirror are respectively mounted on both ends of a laser tube connection body, and in which a hollow block member provided with a pair of mirror means for bending a laser beam is included in said laser tube connection body at a part thereof, and a mirror supporting frame means for receiving said laser resonator and for supporting said total reflection mirror and said output mirror, the apparatus comprising:

a holding plate means for holding said total reflection mirror and said output mirror, a plurality of fastening means for attaching said holding plate means to said supporting frame means with an air gap being formed between said holding plate means and said supporting frame means, said fastening means being arranged in pairs each of which are disposed along a straight line, said supporting frame means being subjected to substantially the same deformation along the respective straight lines, a center of said total reflection mirror and a center of said output mirror respectively lying on said straight lines, and said pairs of fastening means are arranged symmetrically with respect to said respective centers of said total reflection mirror and said output mirror.

6. A gas laser oscillation apparatus according to claim 5, further comprising:

a block member holding plate means for holding at least one block member, said at least one block member being said hollow block member provided with a pair of mirror means for bending a laser beam, at least a pair of fastening means for attaching said block member holding plate means to said supporting frame means with an air gap being formed between said block member holding plate means and said supporting frame means, said pair of fastening means being arranged on a straight line, said supporting frame means being subjected to substantially the same deformation along said straight line, a midpoint of said pair of mirror means being provided in said block member lying substantially on said straight line and, said pair of fastening means for attaching said block member holding plate means are arranged symmetrically with respect to said midpoint.

7. A gas laser oscillation apparatus according to claim 5, wherein a spacer means is interposed between said holding plate means and said supporting frame means to form said air gap.

8. A gas laser oscillation apparatus according to claim 6, wherein a spacer is interposed between said supporting frame means and each of said holding plate means and said block member holding plate to form said air gap.

9. A gas laser oscillation apparatus according to claim 7, wherein an elastic material is interposed between a part of said fastening means and said holding plate means.

10. A laser oscillation apparatus according to claim 8, wherein an elastic material is interposed between a part of said fastening means and each of said holding plate means and said block member holding plate means.

11. A gas laser oscillation apparatus including a laser resonator in which a total reflection mirror and an output mirror are respectively provided at ends of a laser tube connection body, and a supporting frame means for receiving said laser resonator and for supporting said total reflection mirror and said output mirror, the apparatus comprising:

a holding plate means for holding said total reflection mirror and said output mirror, a plurality of fastening means for attaching said holding plate means to a first portion of said supporting frame means with an air gap formed between said holding plate means and said supporting frame means, said plurality of fastening means being arranged in pairs each of which is disposed along a straight line along which the supporting frame means is subjected to the same deformation, a center of said total reflection mirror and a center of said output mirror respectively lying along the straight lines, and each of said pair of fastening means are symmetrically disposed with respect to the respective centers of said total reflection mirror and said output mirror.

12. A gas laser oscillation apparatus according to claim 11, further comprising at least one hollow block means provided with a pair of mirror means for bending a laser beam, a second holding plate means for holding said at least one block means, at least a pair of fastening means for attaching said second holding plate means to a second portion of said supportin frame means with an air gap formed between said second holding plate means and said supporting frame means, said pair of fastening means for attaching said second holding plate means being arranged on a straight line along which the supporting frame means is subjected to the same deformation, a midpoint between said pair of mirror means provided in said block means lying substantially on said straight line, said pair of fastening means for attaching said second holding plate means being arranged symmetrically with respect to said midpoint.

* * * * *